United States Patent

[11] 3,538,893

[72] Inventor Henry E. Tinsley
 11250 Soforenko Drive, Jacksonville, Florida 32218
[21] Appl. No. 804,911
[22] Filed March 6, 1969
[45] Patented Nov. 10, 1970

[54] ROTARY ENGINE
 21 Claims, 8 Drawing Figs.
[52] U.S. Cl. .................................................. 123/8.09,
 123/8.15, 418/114, 418/192
[51] Int. Cl. ............................................. F02b 53/00,
 F02b 55/16
[50] Field of Search ........................................ 123/12, 16,
 44(D); 103/126(TO); 91/87; 230/141

[56] References Cited
 UNITED STATES PATENTS
 470,405  3/1892  Westfall ........................ 91/87
 3,115,124  12/1963  Huthmacher ................. 123/12
 3,401,676  9/1968  Wanzenberg ................. 123/12

Primary Examiner—Allan D. Herrmann
Attorney—George H. Baldwin and Arthur G. Yeager ABSTRACT: The four-cycle rotary combustion engine includes a pair of counter-rotating rotors each having radially extending portions intermeshing with valley portions on the other. Each valley portion includes a primary combustion chamber for receiving the combustible mixture and to compress same as the radially extending portion becomes meshed with a corresponding valley portion. A secondary combustion chamber is within each radially extending portion and a passage means in such portion communicates between the primary and secondary combustion chambers when the portions are intermeshed. Ignition means extend into the cavities substantially aligned with the positions of the primary combustion chambers when the volume capacities are minimized for igniting the mixture within the primary and secondary combustion chambers and corresponding passage means. Each radially extending portion includes a cylinder and a reciprocating piston assembly. A magnetic means radially forces each piston outwardly during the suction or intake stroke at cranking speeds of the engine. Another ignition means are substantially aligned with the positions of the primary combustion chambers prior to when the volume capacities are minimized but after the compression stroke has been initiated. The engine ignition means ignites the mixture in the primary and secondary combustion chambers prior to exhausting of the immediately preceding primary and secondary combustion chambers to provide an overlap in the power cycle of the engine.

INVENTOR.
Henry E. Tinsley
BY
George H. Baldwin
ATTORNEY

Patented Nov. 10, 1970
3,538,893
Sheet 2 of 3
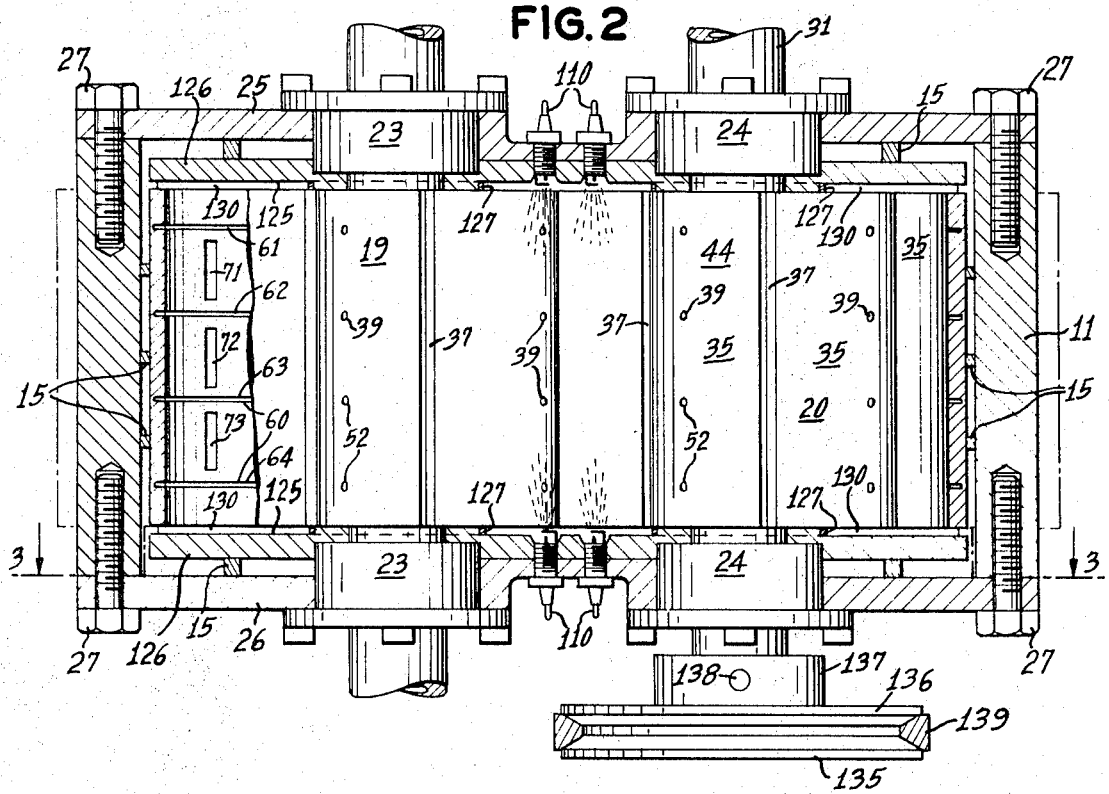
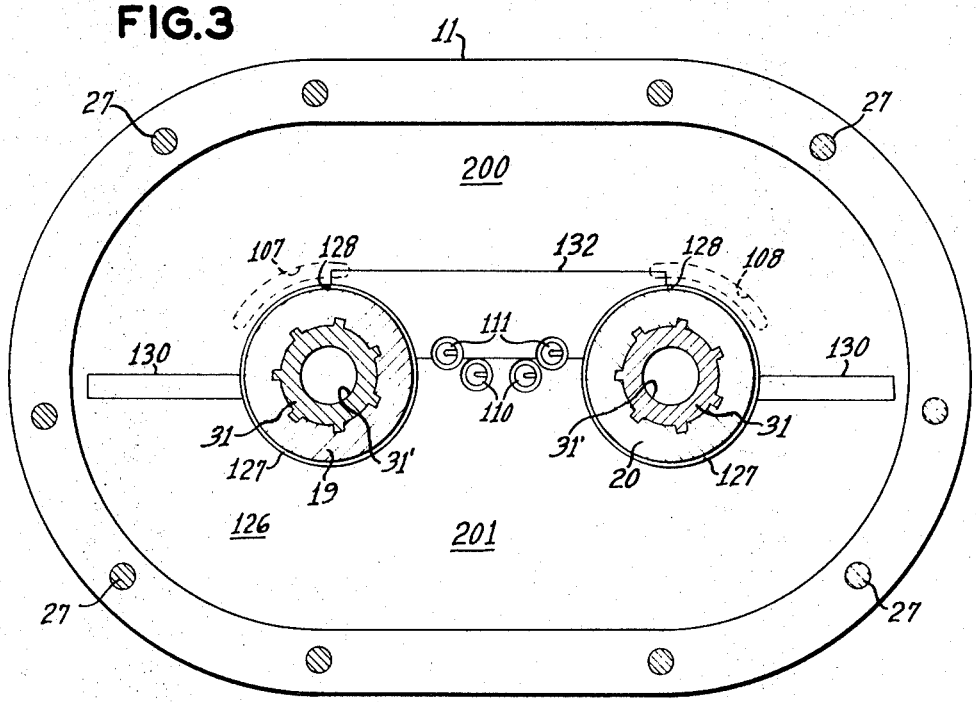
INVENTOR.
Henry E. Tinsley
BY
George H. Baldwin
ATTORNEY Patented Nov. 10, 1970

INVENTOR.
Henry E. Tinsley
BY
George H. Baldwin
ATTORNEY

ROTARY ENGINE

BACKGROUND OF THE INVENTION

1. Field of the Invention

This invention relates to rotary engines and more particularly to a four-cycle rotary combustion engine having a plurality of primary and secondary combustion chambers with power cycle overlap.

2. Description of the Prior Art

Rotary engines of various types have been devised, such engines being exemplified by U.S. Pat. Nos. 868,100; 1,240,112; 1,147,428; 1,493,745; 1,856,011; 2,274,569; 3,115,124; 3,237,613; and 3,323,499. The various problems encountered in the various prior art rotary engines are numerous and are generally well known in the art.

SUMMARY OF THE INVENTION

This invention relates to a rotary combustion engine having a casing and a pair of spaced rotors rotatable therein and each having a plurality of radially extending portions respectively intermeshing with a plurality of valley portions on the other. The radially extending portions and valley portions are alternatively disposed around the circumference of each rotor. Each valley portion includes a primary combustion chamber which is closed by a corresponding radially extending portion meshed therewith. Each radially extending portion has a secondary combustion chamber therein, and passage means communicates between respective primary and secondary combustion chambers.

In another aspect each radially extending portion includes a cylinder and a reciprocating piston assembly, each reciprocating piston having an inner surface means. Each cylinder includes an inner surface means cooperating with corresponding piston inner surface means and defining therewith the secondary combustion chamber. The piston when fully depressed for firing of the fuel and air mixture within the combustion chambers having its outer surface closingly engaging the corresponding surface of the valley defining the primary combustion chamber and minimizing the volume capacity thereof. The piston when fully depressed having its inner surface means closely adjacent the corresponding cylinder inner surface means and minimizing the volume capacity of the secondary combustion chamber.

In a further aspect, the rotary combustion engine includes magnetic means spaced outwardly of the casing and each rotor for radially forcing each piston outwardly to expand the secondary combustion chambers during the suction or intake stroke of the engine and cranking speeds thereof.

Additional aspects include the provision of fuel injection means extending through the casing and communicating with each passage means at the beginning of the intake stroke. Channel means are aligned with each passage means and communicate therewith during rotation of each rotor from about 200° until the rotor rotates from its engagement with the casing at about 260°, the channel means communicating with the combustible mixture inlet conduit for supplying combustible mixture into the passage means and secondary combustion chamber during the intake stroke of the engine. Channel means are aligned with the passage means and communicate therewith during rotation of each rotor from about 110° until the rotor rotates to about 155°, channel means communicating with the exhaust conduit for providing an exhaust passage from the passage means and secondary combustion chamber during the exhaust stroke of the engine. These channel means also communicate with the valleys and provide an exhaust passage therefrom during the exhaust stroke of the engine. Passageways extend through the casing at about 130° as measured from ignition at 0° for supplying pressurized air principally to the valley portions thereby purging remaining exhaust gases therefrom through such channel means and out the exhaust conduit.

A general object of this invention is the provision of an improved rotary combustion engine.

A particular object is to provide a rotary engine having a plurality of primary and secondary combustion chambers.

A related object is the provision of a pair of rotors each having reciprocating pistons and cylinders forming secondary combustion chambers with the primary combustion chamber being formed by and between the intermeshed rotors.

A specific object is to provide an improved rotary engine economical in the manufacture thereof and efficient and durable in operation.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which;

FIG. 2 is a reduced plan view partly in section of the rotary engine of FIG. 1;

FIG. 3 is a cross-sectional view taken along line 3–3 of FIG. 2;

DESCRIPTION OF THE PREFERRED EMBODIMENT

Figure 1:
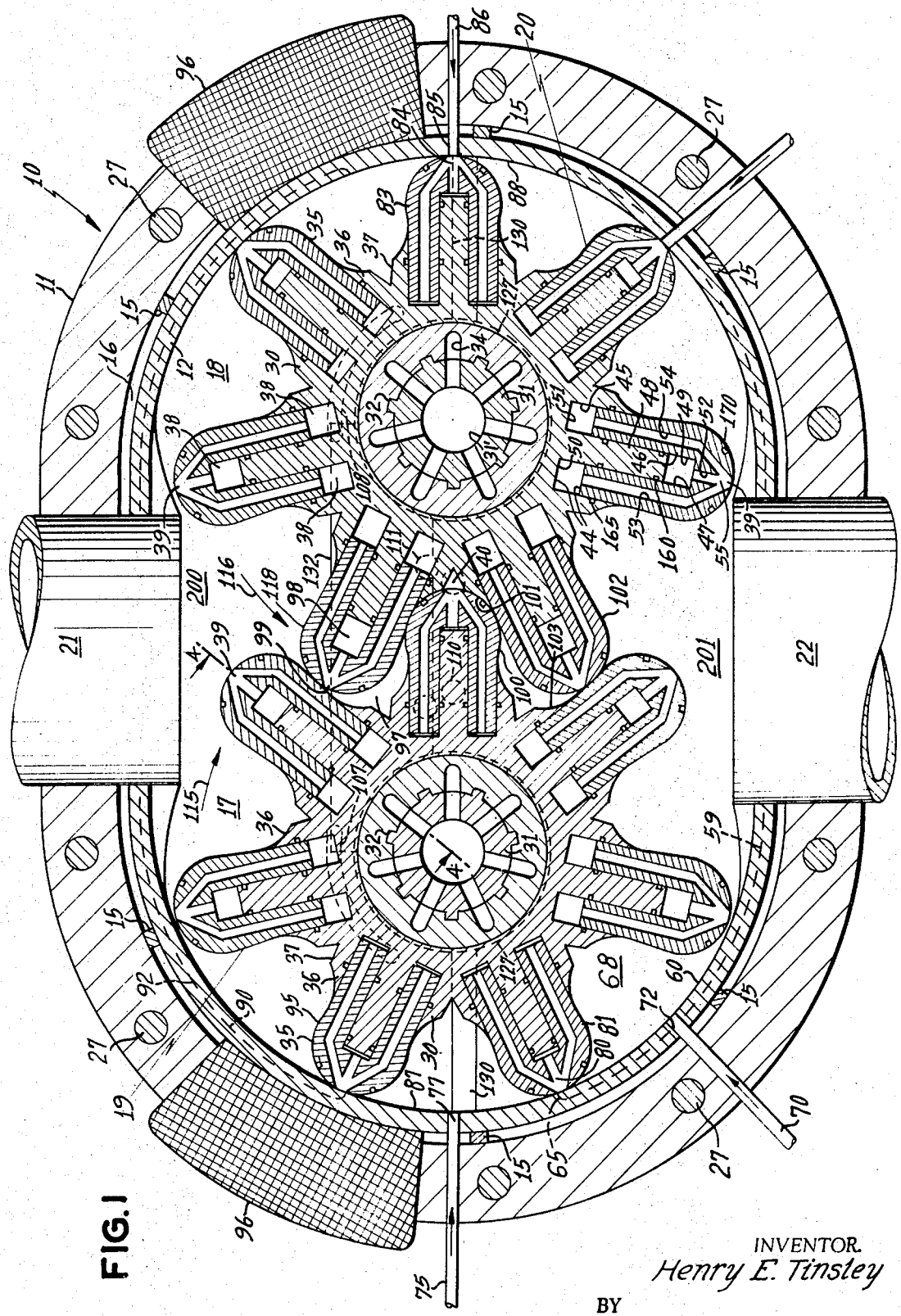
FIG. 1 is a cross-sectional view of a rotary engine in accord with the invention.

Referring now more particularly to the drawings, the improved rotary combustion engine is generally designated at 10 and includes an elongated housing 11 having a generally elliptical cross-sectional form, as shown in FIG. 1, and an elongated inner casing 12 of general elliptical cross-sectional shape within housing 11 and spaced therefrom by a plurality of spacer elements 15 with a fluid coolant chamber 16 formed between housing 11 and casing 12. A suitable source of recirculating fluid coolant (not shown) is supplied to chamber 16 to cool the engine in a well known manner. Casing 12 has formed therewithin a pair of side by side elongated and communicating cavities, generally designated as 17 and 18, in which a pair of counter-rotating and spaced and elongated rotors are respectively mounted for rotation, as hereinafter more fully described. A combustible mixture inlet conduit 21 extends laterally through housing 11 and casing 12 and communicates with cavities 17 and 18, conduit 21 supplying a mixture of oil, fuel and air from an appropriate source or sources (not shown) to these cavities. A main or primary exhaust conduit 22 is generally disposed opposite to inlet conduit 21 and extends laterally through housing 11 and casing 12 and communicates with cavities 17 and 18.

The pair of counter-rotating and spaced rotors 19 and 20 are respectively disposed within cavities 17 and 18, rotors 19 and 20 being journaled on sealed bearings 23 and 24 mounted in vertical supporting housing end walls 25 and 26 which are rigidly and sealingly affixed to the opposite ends of the elongated housing 11 by suitable fasteners in the form of bolts 27 threaded into housing 11, as shown in FIGS. 1 and 2.

Figure 4:
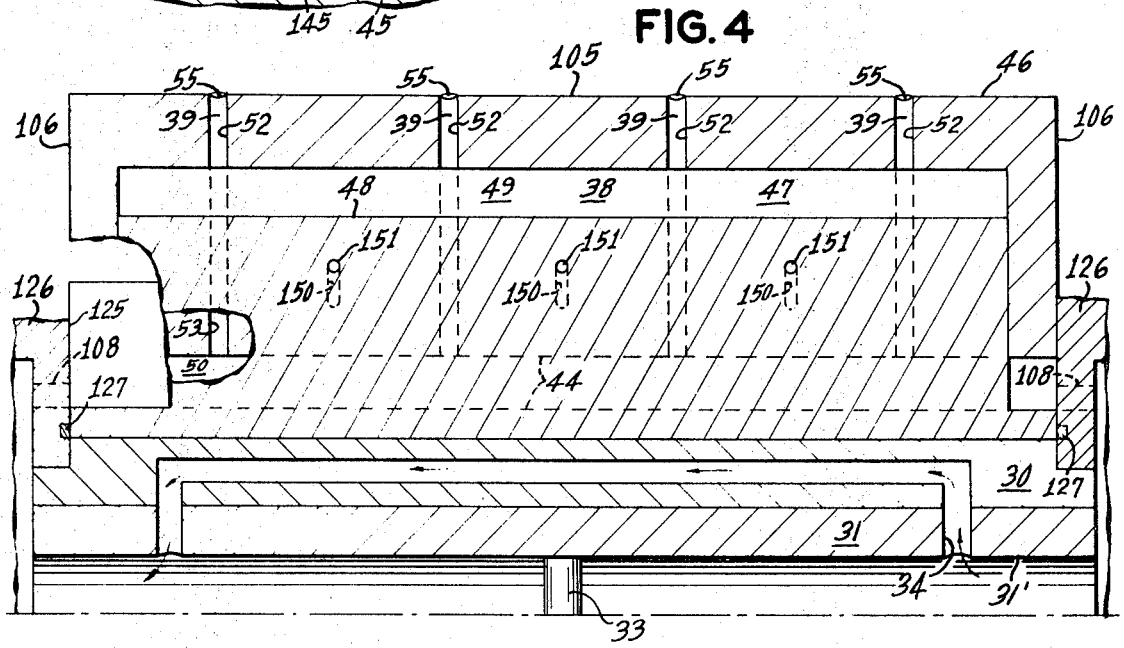
FIG. 4 is an enlarged sectional view taken along line 4–4 of FIG. 1.
Figure 5:
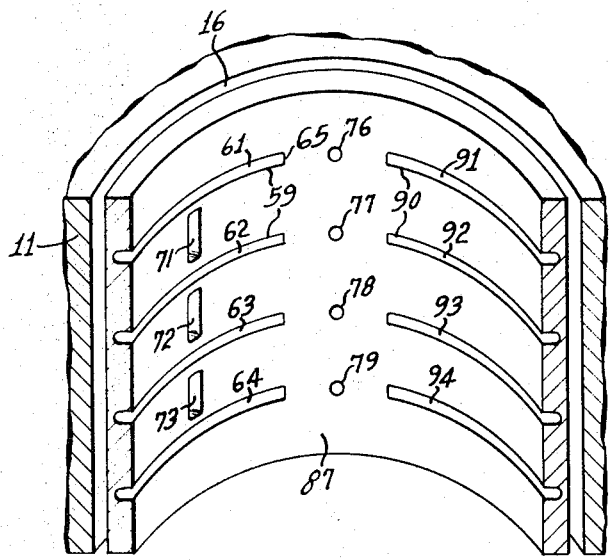
FIG. 5 is a pictorial view of a portion of the rotor casing and being partly in section.

Each of the rotors 19 and 20 include a body member 30 surrounding a hollow shaft 31 with spline connection means 32 securing body member 30 to shaft 31 for rotation therewith. An appropriate source of liquid coolant (not shown) is supplied into one end of the shaft hollow 31' which is plugged as at 33 thereby causing the liquid coolant to be forced outwardly through a passageway 34 communicating with the shaft hollow 31', passageway 34 initially extending outwardly, thence along the body member 30 substantially parallel to the longitudinal axis of shaft 31 for generally the length of the rotor body 30, and inwardly to again communicate with the shaft hollow 31' on the other side of the plug 33, as best illustrated in FIG. 4.

Each of the rotor body members 30 includes radially extending portions 35 intermeshing with respective valley portions 36 of the other rotor body member in a manner substantially similar to the normal intermeshing of gears. A recess 37 is formed in each of the valley portions 36 and constitutes a primary combustion chamber 40 when a corresponding radially extending portion of the other rotor body 30 is intermeshed with valley portion 36, as hereinafter more fully described. Each of the radially extending portions 35 includes a secondary combustion chamber 38 with a passage means 39 communicating between secondary combustion chamber 38 and the primary combustion chamber 40 when said radially extending portion 35 is intermeshed with a corresponding valley portion 36 of the other rotor body member, as hereinafter more fully described.

Each of the radially extending portions 35 of body member 30 is seen to include a cylinder and reciprocating piston assembly 44 having a cylinder 45 formed in the rotor and a reciprocating piston 46 fittingly and slidingly disposed in cylinder 45. Piston 46 includes a radially extending passageway 47 into which a radially extending member or element 48 reciprocates in a relative manner, element 48 being integral with cylinder 45. Piston 46 is suitably connected to element 48, as more fully described in connection with FIG. 6.

The secondary combustion chamber 38 includes three elongated chambers, 49, 50 and 51 extending generally the length of the rotor and being formed and defined by cylinder 45, together with element 48, and piston 46. Passage means 39 includes a conduit 52 smaller in cross section than the cross section of chamber 49 into which conduit 52 opens, and similar conduits 53 and 54 extending through piston 46 and communicating with respective chambers 50 and 51. Each of the conduits 52, 53 and 54 are seen to merge and open outwardly of the piston 46 as at 55. An alternate construction of the passage means 39 will be described hereinafter in connection with FIG. 6.

By reference to FIG. 2, each of the passage means 39 for each cylinder and piston assembly 44 includes a plurality of spaced conduits 52 to permit the ingress of the combustible mixture therethrough into the secondary combustion chamber 38 during the intake stroke, thereby permitting same to be generally uniformly distributed therein, and the egress from the secondary combustion chamber 38 of the exhaust combustion products during the exhaust stroke.

Figure 6:
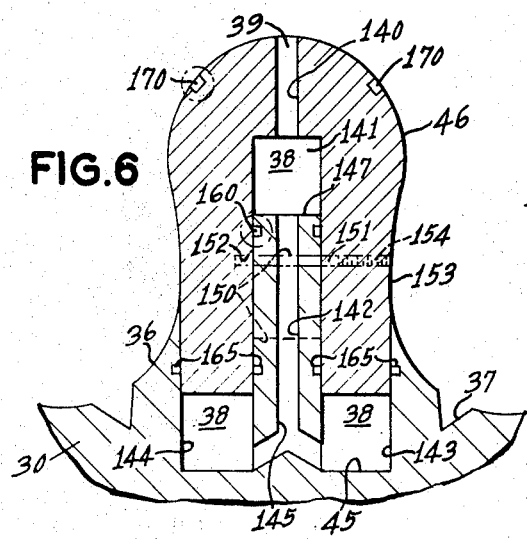
FIG. 6 is an enlarged sectional view of one piston of the rotors and showing an alternate embodiment of the passage means.

In the following description assume that ignition is occurring when piston 100 is fully meshed with valley 101 and piston 100 is in alignment with the centerline between the rotors. Casing 12 is provided with channel means 59 in the inner face 60 thereof which communicate with the exhaust conduit 22. Channel means 59 includes a plurality of spaced channels 61, 62, 63 and 64 aligned with respective spaced conduits 52 extending through each piston 46 as the rotors rotate. Each conduit 52 communicates with the exhaust outlet 22 through respective channels 61—64 during rotation of the rotor from about 110° until about 155° with the channels terminating thereat, as indicated at 65. During this interval, the piston contacts the inner face 60 of casing 12 with the piston being initially fully extended at 110° and substantially fully depressed at 155° to cause the combustion products remaining within the secondary combustion chamber 38 to be forced therefrom during such depression and exhausted through the respective channels and out exhaust outlet 22. Purging of the combustion products from the space 68 between the pistons is accomplished by charges of pressurized air from the supercharger or the like entering through conduits, including conduit 70, located at about 130°, and through the aligned casing ports 71, 72 and 73, located between the channels 61—64, as shown in FIGS. 2 and 6, the pressurized air mixing with and expelling most of the remaining combustion products in the space 68 between the pistons, out through channels 61—64, and thence through exhaust outlet 22.

A plurality of fuel mixture injection conduits, including conduit 75, communicate at about 180° respectively with ports 76, 77, 78 and 79 extending through casing 12, ports 76, 77, 78 and 79 being respectively in alignment with channels 61, 62, 63 and 64 and in alignment with respective conduits 52 of each of the pistons 46. After substantially complete exhausting of the secondary combustion chamber, the conduit 80 of piston 81 becomes aligned with port 77 and receives an injected fuel mixture from conduit 75 in a well known manner. This fuel injection is of particular importance during cranking and idle speeds in that such fuel injection insures the adequate supply of the fuel mixture into the secondary combustion chambers during such speeds. The opposite end of the casing 12 depicts piston 83 in position with its conduit 84 aligned with casing portion 85 for receiving the injected fuel mixture from conduit 86.

At this point it is important to emphasize that each of the ends 87 and 88 of the casing 12 is the mirror image of the other, and that while the description has been generally limited to casing end 87, it is to be understood that end 88 can be substantially described in the same terms and characters as previously set forth in connection with casing end 87.

Channel means 90 are provided in the inner casing face 60 beginning at a location approximately 200° from the ignition at 0° and communicating with the inlet conduit 21. Channel means 90 includes a plurality of spaced channels 91, 92, 93 and 94 aligned with respective spaced conduits 52 extending through each piston 46 as the rotors rotate. Each conduit 52 communicates with the inlet conduit 21 through respective channels 91—94 during rotation of the rotor from about 200° until said rotor rotates to about 260°. During this interval the piston contacts the inner face 60 of casing 12 with the piston being initially almost fully depressed at 200° and fully extended at 260° to cause the secondary combustion chamber 38 to be enlarged and to cause the combustible mixture within inlet conduit 21 and channel means 90 to enter through passage means 39 in each of the pistons 46 and into the secondary combustion chamber 38.

Also, the secondary combustion chambers 38 are exposed through arcuate ports 107 and 108 which communicate with inlet conduit 21 by any suitable means (not shown) for supplying combustible chambers during expansion thereof, i.e., during the intake stroke of the piston. Arcuate ports 107 and 108 herein are shown as extending through each of the end plates 126 and communicate with inlet conduit 21 through suitable conduits (not shown) extending respectively through housing end walls 25 and 26 and attached to inlet conduit 21 exteriorly of housing 11. Arcuate ports 107 and 108 are openly exposed to the secondary chambers 38 during the interval of travel of the rotors from about 200° to about 280° as indicated clearly in FIG. 1.

As previously indicated, some fuel mixture has been injected through fuel injection conduit 75 into the passage means 39 and secondary combustion chamber 38 and additional combustible mixture is taken into secondary combustion chamber during the expansion of the secondary combustion chamber while the piston moves from its initial communication with channel means 90 at 200° until the secondary combustion chamber 38 is fully extended at 260°.

During normal operation of the engine, the centrifugal forces acting upon the rotating rotors will cause the pistons to be expanded from their substantially fully depressed condition, as shown by piston 95, until piston 95 rotates to a position of approximately 260° at which time the secondary combustion chamber 38 will be fully expanded. During cranking speeds it is important that the engine be provided with means 96 for radially forcing each piston outwardly to expand the secondary combustion chamber 38 during the suction or intake stroke of the engine at cranking speed. The specific means 96, shown in the preferred embodiment, is an electromagnetic means magnetically attracting the piston as the piston moves from about 180° to about 250° thereby causing the piston to become expanded from its fully collapsed position at 180° to substantially its fully expanded position at 260°.

During the rotation of the piston from 260° to approximately 308° the injected fuel mixture within the secondary combustion chamber 38 and the combustible mixture fed into the engine through inlet 21 and through channel means 90 into secondary combustion chamber 38 and the combustible mixture fed through arcuate ports 107 and 108 into secondary combustion chamber 38 generally become equalized with combustible mixture pressure present within the valley portion between a pair of pistons into which a piston is about to be intermeshed. In other words the pressure at primary combustion chamber 97 and the pressure at secondary combustion chamber 98 together with the pressure in passage means 99 are generally equalized at the beginning of the compression stroke.

The compression stroke commences when passage means 99 becomes blocked by the adjacent piston on the other rotor. Upon further rotation from 308° to 0° the secondary and primary combustion chambers have their volume capacities minimized at which time ignition of the compressed combustible mixture occurs by the firing of a respective spark plug 110 adjacent each end plate 25 and 26, such spark plug 110 being in alignment with the primary combustion chamber which it is to fire.

It is to be understood that at cranking, idle and slow rotor speeds the engine is designed to have ignition of the compressed combustible mixture at 0° while at high rotor speeds, and due to the time lapse required for the particular fuel being used in the engine, another set of spark plugs 111 extend through the end walls 25 and 26 in alignment with the primary combustion chamber, but advanced a predetermined number of degrees, for example, 8° to 12°, and preferably about 10°. Such a spark plug arrangement then permits the firing of the spark plugs prior to the time in which the primary and secondary combustion chambers are at their most compressed condition, but the combustion will normally occur at approximately 0° to maintain the efficiency of the engine. Alternatively the plugs 110 could be fired in a substantially continuous manner much like the firing of the plugs in a turbine engine or the like.

Referring to FIG. 3, mounted in the inner surface 125 of each of the inner end plates 126 are circular seals 127 cooperating with the outer ends of the rotors to seal same against leakage. Pins 128 connect seals 127 to end plates 126 to prevent the seals 127 from rotating with the rotors. Seals 130 are mounted in each of the inner end plates generally in alignment with the centerline between the rotors 19 and cooperate with the ends of the pistons 46 during rotation of the rotors, such seals 130 preventing leakage between the intake portion, generally indicated at 200, and the exhaust portion, generally indicated at 201, of the engine. Another seal 132 is mounted in the inner surface 125 of each end plate 126, seal 132 extending between seals 127 and sealing the ends of the pistons 46 primarily during the compression stroke of each piston, i.e., between about 308° and 0°. While the seal 132 is not shown as extending to a point completely sealing the primary and secondary combustion chambers when the combustion or power cycle is initiated, it is to be understood that this seal could be so enlarged to seal same if found desirable. By employing seals 127, 130 and 132 the effective separation of the intake portion or section 200 is isolated from exhaust portion or section 201 whereby the efficiency of the engine is maintained.

By reference to FIG. 2, a power takeoff 135 is connected to one of the shafts 31 for transferring power from the engine to, for example, the wheels of a vehicle (not shown). Power takeoff 135 is shown herein as a pulley 136, affixed to shaft 31 by adapter 137 and connector 138, and a belt 139 engages pulley 136. Any well known power takeoff or transfer means may be provided for this engine as is common in the art.

As may be clearly understood by reference to FIGS. 1, 2 and 4, piston 46 includes a top portion 105 through which the passage means 39 extend and end portions 106 which cooperate with end plates 126 and seals 130 and 132 to prevent the aforementioned leakage between the intake portion 200 and exhaust portion 201 of the engine.

FIG. 6 depicts the alternate construction of the passage means 39 extending through the piston 46. Passage means 39 includes a conduit 140 communicating with elongated chamber 141, another conduit 142 communicating between chamber 141 and elongated chambers 143 and 144, chambers 141, 143 and 144 corresponding respectively to chambers 49, 50 and 51, shown in FIGS. 1 and 4, and constituting secondary combustion chamber 38. The lower conduit end 145 is Y-shaped and communicates with chambers 143 and 144 adjacent the bottom of the cylinder 45 forming such chambers.

An upstanding element 147 extends upwardly of the cylinder 45, and forms one side of each of the chambers 144 and 143. Element 147 includes a slot 150 extending laterally therethrough and a pin 151 connected to the piston 46 is caged within and reciprocates within slot 150. Pin 151 fits within an opening 152 drilled laterally into piston 46 through surface 153 and an Allen head screw 154 or the like affixes the pin 151 in position and substantially fills the opening 152 after insertion of pin 151 therebefore.

By reference to FIG. 4, it is seen that piston 46 includes a plurality of spaced pins 151 riding within respective slots 150 in upstanding element 48 of FIG. 1 or element 147 of FIG. 6, slots 150 and pins 151 being spacedly located between respective pairs of the passage means 39.

Figures 7, 8:
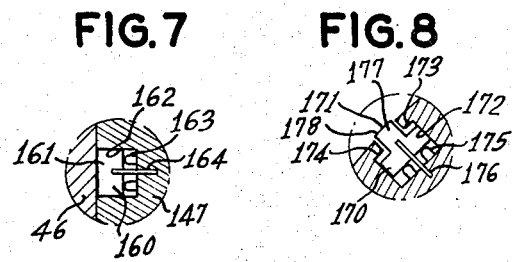
FIG. 7 is an enlarged sectional view of one of the internal piston seals shown in FIG. 6.
FIG. 8 is an enlarged sectional view of one of the external piston seals shown in FIG. 6.

The internal seals 160 are specifically shown in FIG. 7 and each includes an elongated seal member 161 recessed within a channel 162 formed in piston 46. An elongated leaf spring 163 is bottomed in channel 162 and forcibly urges member 162 sealingly against upstanding element 147. Pin means 164 extend through spring 163 and into seal member 161 for connecting same to channel 162 thereby preventing lateral shifting of the spring and seal member from their location within channel 162. Seals 165 are identical in construction to seal 160 except they are mounted in different portions of the piston and cylinder assembly, as shown in FIG. 7.

The external seals 170 are shown in FIG. 8 and each includes an elongated seal member 171 recessed within a channel 172 formed in piston 46. Channel 172 includes a pair of shoulders 173 and 174 to prevent the seal from becoming disengaged with the channel 172 while the seal is not being engaged by another surface during rotation of the rotors. An elongated leaf spring 175 is bottomed in channel 172 and forcibly urges member 171 outwardly to seal against the outer piston surface during meshing of the piston with a corresponding valley portion as exemplified by piston 100 in FIG. 1. To prevent lateral shifting of the seal member 171 and spring 175, pin means 176 are inserted through openings, including opening 177 through seal member 171, pin means 176 being recessed substantially inwardly of the outer sealing surface 178 of member 171.

The operation of the engine can best be seen by consideration of FIGS. 1 and 2. The engine is a four-cycle engine namely, intake or suction, compression, power and exhaust. The power cycle for each piston begins at 0°, i.e. when one piston 100 is fully meshed with a valley 101 and with the piston centered on the centerline between the longitudinal axes of shafts 31 and rotors 30, as illustrated in FIG. 1. In this condition the primary combustion chamber 40 and secondary combustion chamber 38 have minimum volume capacity in which the combustible mixture has been compressed during the preceding compression cycle. One of the sparkplugs 110 at each end is then fired to ignite the compressed combustible mixture in each of the primary and secondary combustion chambers 40 and 38, as well as the passage means 39 communicating therebetween, whereby the ignited mixture will forceably act upon the rotors upon combustion to rotate same in the direction in which the rotors were initially rotating as indicated by arrows 115 and 116. It is to be understood that the rotors are initially rotated in the directions indicated by arrows 115 and 116 by a conventional starter (not shown) or the like in a manner well known in the art. Upon rotation of rotor 19 from the ignition 0° position to about 53°, the passage means 39 becomes unblocked by a separation of the meshed piston on the one rotor from the meshed valley portion on the other rotor at which time the exhaust cycle of the engine begins. The previously meshed piston 102 is shown as being almost to the position in which the exhaust cycle of the secondary combustion chamber formed therein and the primary combustion chamber formed between piston 102 and the meshed corresponding valley portion 103, begins, the exhaust cycle thereof commencing upon slight further rotation when the passage means 39 is unblocked. At about 110° the fully expanded piston begins making contact with casing 12 for causing the piston to be collapsed from such fully expanded position to a substantially collapsed position at about 155°, and during such interval the secondary combustion chamber communicates through passage means 39 with the aligned channel means 59 formed within the inner surface 60 of casing 12 for exhausting the combustion products within the secondary combustion chamber through such channel means 59 and out the primary exhaust conduit 22. Located approximately at 130°, as measured from ignition at 0°, are several ports 77—73 communicating within casing 12 for supplying charges of pressurized air from conduits 70 along the rotor valley as shown at 68 thereby purging most of the remaining exhaust gases or combustion products therefrom through channel means 59 and out exhaust conduit 32. When the rotor rotates further, the piston will have its passage means 39 aligned with fuel injection ports 76—79 for injecting an oil and fuel mixture into passage means 39 and into the secondary combustion chamber 38. At this point, approximately 180° from ignition at 0°, the intake stroke for this piston begins. Upon further rotation this piston begins expanding either by action of the electromagnet means 96 and/or by the centrifugal force action on the piston with passage means 39 communicating with channel means 90 in the inner surface 60 of casing 12, channel means 90 communicating with the intake conduit 21. Passage means 39 communicates with such channel means 90 at approximately 200° until about 260°, whereupon the secondary combustion chamber 38 is fully expanded. Also, the preceding valley portion of the piston has been exposed to the combustible mixture from conduit 21 through channel means 90 and such mixture is supplied thereto as the rotor continues to rotate. The induction cycle for piston and its cooperating valley portion on the other rotor terminates at approximately 308° when this piston contacts the adjacent piston with the passage means 39 blocked thereby just prior to the position shown, for example, by piston 118. During the travel of the piston from about 255° to the 308° the pressure within the secondary combustion chamber 38 and passage means 39 tends to equalize with the induction combustible mixture pressure at 21 thereby assuring induction generally equalized pressure within secondary combustion chamber 38 and passage means 39 within the pressure in the primary combustion chamber 97. At about 308° the compression cycle for the piston begins and the piston and respective primary combustion chamber then have their respective volume capacities minimized as shown by the position of piston 100. It is thus seen with seven pistons on each of the rotor that during one revolution of the rotors there will be fourteen combustions with a combustion overlap of approximately 7° before exhausting of the previously fired combustion chambers commences, thus providing a generally sustained power from the engine.

While only a certain preferred embodiment of this invention has been shown and described by way of illustration, many modifications within the true spirit and scope of this invention and within the following claims will occur to those skilled in the art.

I claim:
1. In a rotary combustion engine comprising a casing, a pair of spaced rotors rotatable in said casing and each having a plurality of radially extending portions respectively intermeshing with a plurality of valley portions on the other, said radially extending portions and valley portions being alternatively disposed around the circumference of each said rotor, each said valley portion including a primary combustion chamber which is closed by respective said radially extending portion meshed therewith, each said radially extending portion including a secondary combustion chamber, and passage means in each said radially extending portion communicating between respective said primary and secondary combustion chambers.

2. In the rotary combustion engine as defined in claim 1 wherein each said radially extending portion includes a cylinder and a reciprocating piston assembly, said reciprocating piston having an inner surface means operatively associated with and defining a corresponding said secondary combustion chamber, and said passage means extend through said piston.

3. In the rotary combustion engine as defined in claim 2 wherein each said cylinder having inner surface means cooperating with corresponding said piston inner surface means and defining therewith said secondary combustion chamber, said piston when fully depressed for firing of the fuel and air mixture within said combustion chambers having its outer surface closingly engaging the corresponding surface of said valley defining said primary combustion chamber and minimizing the volume capacity thereof, said piston when fully depressed having its inner surface means closely adjacent the corresponding cylinder inner surface means and minimizing the volume capacity of said secondary combustion chamber.

4. In the rotary combustion engine as defined in claim 2 further comprising magnetic means spaced outwardly of said casing and each said rotors for radially forcing each said piston outwardly to expand said secondary combustion chambers during the suction or intake stroke of said engine at cranking speeds thereof.

5. In the rotary combustion engine as defined in claim 1 further comprising fuel injection means extending through said casing and communicating with each said passage means at the beginning of the intake stroke, said fuel injection means supplying fuel to said secondary combustion chamber during cranking and idle speeds of the engine.

6. In the rotary combustion engine as defined in claim 1 wherein each said radially extending portion includes a cylinder and reciprocating piston assembly having a cylinder formed in said rotor and a reciprocating piston having a portion fittingly and slidingly disposed in said cylinder, said piston portion having a passageway extending generally radially of said rotor, a radially extending member integral with said cylinder for reciprocating within said passageway, said passage means including a conduit smaller in cross section than the cross section of said passageway and communicating between said passageway and said primary combustion chamber, said secondary combustion chamber being formed and defined by said cylinder and piston and radially extending member.

7. In the rotary combustion engine as defined in claim 1 wherein each said rotor is elongated and adapted to be rotated about its longitudinal axis, each said radially extending and valley portions longitudinally extending generally the length of said rotors, each said primary and secondary combustion chambers extending generally the length of said rotors, each said passage means including a plurality of passageways spaced along said longitudinal axis communicating between respective said primary and secondary combustion chambers.

8. In the rotary combustion engine as defined in claim 1 wherein said casing contacts each said rotors from about 110° rotation thereof after ignition to about 260°, further comprising a combustible mixture inlet conduit communicating with said cavities, said casing including channel means aligned with said passage means and communicating therewith during rotation of each said rotor from about 200° until said rotor rotates from its engagement with said casing at about 260°, said channel means communicating with said inlet conduit and providing a combustible mixture into said passage means and secondary combustion chamber during the intake stroke of the engine.

9. In the rotary combustion engine as defined in claim 1 wherein said casing contacts each said rotors from about 110° rotation thereof after ignition to about 260°, further comprising an exhaust conduit communicating with said cavities, said casing including channel means aligned with said passage means and communicating therewith during rotation of each said rotor from about 110° until said rotor rotates to about 155°, said channel means communicating with said exhaust conduit and providing a exhaust passage from said passage means and secondary combustion chamber during the exhaust stroke of the engine, said secondary combustion chambers having their volume capacities decreased during rotation of said rotors from a maximum at about 110° to a minimum at about 180°, said channel means also communicating with said valleys and providing an exhaust passage therefrom during the exhaust stroke of the engine.

10. In the rotary combustion engine as defined in claim 9 wherein said casing includes passageways disposed at about 130° as measured from ignition at 0° for supplying pressurized air principally to said valley portions thereby purging remaining exhaust gases therefrom through said channel means and out said exhaust conduit.

11. A rotary combustion engine comprising a substantially elliptical casing formed with a pair of side-by-side communicating cavities, a combustible mixture inlet conduit communicating with said cavities, said cavities being provided with a primary exhaust outlet conduit generally oppositely disposed with respect to said inlet conduit, a pair of counter-rotating and spaced rotors mounted for rotation in respective said cavities and having radially extending portions intermeshing with valley portions on the other, each said valley portion including a primary combustion chamber adapted to receive the mixture from said inlet conduit and to compress the mixture as said radially extending portions become meshed with corresponding said valley portions, each said primary combustion chamber having its volume capacity minimized when said radially extending portion and corresponding valley portion are fully intermeshed, each said radially extending portion including a secondary combustion chamber, a passage means in each said radially extending portion communicating between said primary and secondary combustion chambers, each said secondary combustion chamber having its volume capacity minimized when said radially extending portion and corresponding valley portion are fully intermeshed, ignition means extending into said cavities substantially aligned with the positions of said primary combustion chambers when the volume capacities are minimized for igniting the mixture within said primary and secondary combustion chambers and corresponding said passage means whereby the ignited mixture will forcibly act upon said rotors upon combustion to rotate same with the products of combustion subsequently escaping through said primary exhaust conduit.

12. In the rotary combustion engine as defined in claim 11 further comprising another ignition means substantially aligned with the positions of said primary combustion chambers prior to when the volume capacities are minimized but after the compression stroke has been initiated, said ignition means being utilized to ignite the compressed mixture in said combustion chambers during cranking, idle and slow rotor speeds, said other ignition means being utilized to ignite the compressed mixture in said combustion chambers during high rotor speeds.

13. In the rotary combustion engine as defined in claim 11 wherein said ignition means ignites the mixture in said primary and secondary combustion chambers prior to exhausting of the immediately preceding primary and secondary combustion chambers thereby providing an overlap in the power cycle of the engine.

14. In the rotary combustion engine as defined in claim 11 wherein each said radially extending portion includes a cylinder and a reciprocating piston assembly, said reciprocating piston having an inner surface operatively associated with and defining a corresponding said secondary combustion chamber, and said passage means extend through said piston.

15. In the rotary combustion engine as defined in claim 14 wherein each said piston includes an inner surface means, each said cylinder having inner surface means cooperating with corresponding said piston inner surface means and defining therewith said secondary combustion chamber, said piston when fully depressed for firing of the combustible mixture within said combustion chambers having its outer surface closingly engaging the corresponding surface of said valley defining said primary combustion chamber and minimizing the volume capacity thereof, said piston when fully depressed having its inner surface means closely adjacent the corresponding cylinder inner surface means and minimizing the volume capacity of said secondary combustion chamber.

16. In the rotary combustion engine as defined in claim 14 further comprising magnetic means spaced outwardly of said casing and each said rotors for radially forcing each said piston outwardly to expand said secondary combustion chambers during the suction or intake stroke of said engine at cranking speeds thereof.

17. In the rotary combustion engine as defined in claim 11 further comprising fuel injection means extending through said casing and communicating with each said passage means at the beginning of the intake stroke, said fuel injection means supplying fuel to said secondary combustion chamber during cranking and idle speeds of the engine.

18. In the rotary combustion engine as defined in claim 11 wherein each said radially extending portion includes a cylinder and reciprocating piston assembly having a cylinder formed in said rotor and a reciprocating piston having a portion fittingly and slidingly disposed in said cylinder, said piston portion having a passageway extending generally radially of said rotor, a radially extending member integral with said cylinder for reciprocating within said passageway, said passage means including a conduit smaller in cross section than the cross section of said passageway and communicating between said passageway and said primary combustion chamber, and secondary combustion chamber being formed and defined by said cylinder and piston and radially extending member.

19. In the rotary combustion engine as defined in claim 11 wherein each said rotor is elongated and adapted to be rotated about its longitudinal axis, each said radially extending and valley portions longitudinally extending generally the length of said rotors, each said primary and secondary combustion chambers extending generally the length of said rotors, each said passage means including a plurality of passageways spaced along said longitudinal axis communicating between respective said primary and secondary combustion chambers.

20. In the rotary combustion engine as defined in claim 11 wherein said casing contacts each said rotors from about 110° rotation thereof after ignition to about 260°, said casing including channel means aligned with said passage means and communicating therewith during rotation of each said rotor from about 200° until said rotor rotates from its engagement with said casing at about 260°, said channel means communicating with said inlet conduit and providing a combustible mixture into said passage means and secondary combustion chamber during the intake stroke of the engine.

21. In the rotary combustion engine as defined in claim 11 wherein said casing contacts each said rotors from about 110° rotation thereof after ignition to about 260°, said casing including channel means aligned with said passage means and communicating therewith during rotation of each said rotor from about 110° until said rotor rotates to about 155°, said channel means communicating with said exhaust conduit and providing an exhaust passage from said passage means and secondary combustion chamber during the exhaust stroke of the engine, said secondary combustion chambers having their volume capacities decreased during rotation of said rotors from a maximum at about 110° to a minimum at about 180°, said channel means also communicating with said valleys and providing an exhaust passage therefrom during the exhaust stroke of the engine.